(12) United States Patent
Perry

(10) Patent No.: US 9,576,497 B2
(45) Date of Patent: *Feb. 21, 2017

(54) CHORD PLAYING ATTACHMENT

(71) Applicant: Travis Perry, Dothan, AL (US)

(72) Inventor: Travis Perry, Dothan, AL (US)

( * ) Notice: Subject to any disclaimer, the term of this patent is extended or adjusted under 35 U.S.C. 154(b) by 10 days.

This patent is subject to a terminal disclaimer.

(21) Appl. No.: 14/637,005

(22) Filed: Mar. 3, 2015

(65) Prior Publication Data

US 2015/0310759 A1 Oct. 29, 2015

Related U.S. Application Data

(63) Continuation of application No. 13/809,844, filed as application No. PCT/US2011/044002 on Jul. 14, 2011, now Pat. No. 8,969,694.

(60) Provisional application No. 61/572,279, filed on Jul. 14, 2010.

(51) Int. Cl.
*G09B 15/06* (2006.01)

(52) U.S. Cl.
CPC ................... *G09B 15/06* (2013.01)

(58) Field of Classification Search
CPC ..... G09B 15/00; G09B 15/003; G09B 15/008; G09B 11/02; G09B 11/04; G09B 15/006; G09B 15/009; G10G 1/00
USPC ............... 84/470 R, 477 R, 485 R
See application file for complete search history.

(56) References Cited

U.S. PATENT DOCUMENTS

| 4,545,281 A * | 10/1985 | Habicht | G10D 3/08 84/315 |
| 4,566,365 A * | 1/1986 | Huston, Jr. | G10D 3/08 84/317 |
| 5,323,676 A * | 6/1994 | Kennedy | G10D 3/043 84/317 |
| 8,835,731 B1 * | 9/2014 | Perry | G10D 3/08 84/317 |
| 8,969,694 B2 * | 3/2015 | Perry | G09B 15/06 84/317 |

* cited by examiner

*Primary Examiner* — Kimberly Lockett
(74) *Attorney, Agent, or Firm* — Garvey, Smith, Nehrbass & North, L.L.C.; Mackenzie D. Rodriguez; Seth M. Nehrbass

(57) ABSTRACT

A chord playing attachment and related method is disclosed. The chord playing attachment may be attached to a guitar or similar stringed instrument, and the user may use the chord playing attachment to learn to play the instrument. Unlike other chord playing attachments, the present invention discloses a design that does not function as a capo, which allows the user play chords in standard keys. The present invention also discloses tabs that may be removed or swapped by the user to allow the user to play some chords by pressing the strings directly and some by pressing a finger pad. The present invention encourages novices to learn to play the instrument in stages and eventually remove the invention entirely. A companion teaching manual is also disclosed.

14 Claims, 7 Drawing Sheets

CHORD PLAYING ATTACHMENT

CROSS-REFERENCE TO RELATED APPLICATIONS

Priority of U.S. patent application Ser. No. 12/835,887, filed 14 Jul. 2010, and hereby incorporated herein by reference, is hereby claimed. U.S. patent application Ser. No. 12/835,887 was by request dated 13 Jul. 2011 converted to a U.S. provisional patent application.

STATEMENT REGARDING FEDERALLY SPONSORED RESEARCH OR DEVELOPMENT

Not applicable

REFERENCE TO A "MICROFICHE APPENDIX"

Not applicable

FIELD OF THE INVENTION

This invention relates generally to chord playing attachments and specifically to a chord playing attachment that may be used to play a guitar and may be employed as a teaching tool.

BACKGROUND OF THE INVENTION

Two problems present themselves when a student attempts to learn the guitar or a similar stringed instrument. The guitar strings injure the student's fingertips until the student develops calluses; and the student faces a steep learning curve prior to playing actual music. The latter problem often causes severe frustration, which in turn causes most novices to quickly abandon their learning attempts. Teaching the student a series of musical chords allows the student to play music quickly, which encourages the student to keep playing until greater understanding is gained and reduces frustration.

Various chord attachments have been developed to allow the user to play chords easily without injuring their fingers. None of these devices have ever attained widespread popularity because none of them have been designed as teaching tools. Many of the older versions were intricate, heavy, and hard to use. Some even mask the strings from the users view, resulting in the user being unable to learn any chords while using the device. Newer versions are more usable, but do not encourage the user to play any strings directly. This forces the user to build up calluses all at once and forces the user to make the mental leap directly from playing by pressing buttons to playing by depressing complex string combinations. None of the previous chord attachments allow the user to take an intermediate step or steps to ease them into the process of playing without the aid of training devices. Also, none of the previous chord attachments were paired with a user friendly training manual to teach the user how to play chords in the right order to create songs without requiring the user be able to read standard sheet music. Additionally, many of the previous chord attachments depress all of the guitar strings at a specific point, which causes those devices to act as a capo. A capo device is undesirable because it changes the key of all of the chords played, which means that any attempts to play the guitar with the attached device will result in music that is nonstandard.

Therefore, what is needed is a chord playing attachment. The chord playing attachment should allow the user to play some chords by hand and some chords by depressing buttons. The chord playing attachment should also be used in combination with a color-coded training manual. Furthermore, other desirable features and characteristics of the present invention will become apparent when this background of the invention is read in conjunction with the subsequent detailed description of the invention, appended claims, and the accompanying drawings.

SUMMARY OF THE INVENTION

The present invention advantageously fills the aforementioned deficiencies by providing a chord playing attachment. The chord playing attachment comprises removable chord members with color-coded finger pads that depress the strings necessary to play a chord or part of a chord. The chord playing attachment allows the user to remove some of these cord members to play some chords by hand and some by pressing buttons, and thereby provides an intermediate step between playing the instrument with a teaching device and playing the instrument unaided. The chord playing attachment is also usable in combination with a color-coded training manual for easy learning.

The present invention now will be described more fully hereinafter with reference to the accompanying drawings, which are intended to be read in conjunction with both this summary, the detailed description, and any preferred and/or particular embodiments specifically discussed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

The drawings contained herein exemplify two of the embodiments of the claimed invention. The invention is not limited to the embodiments shown. The embodiments shown are purely examples, and the invention is capable of many variations of said embodiments. In the drawings.

Figure 1:
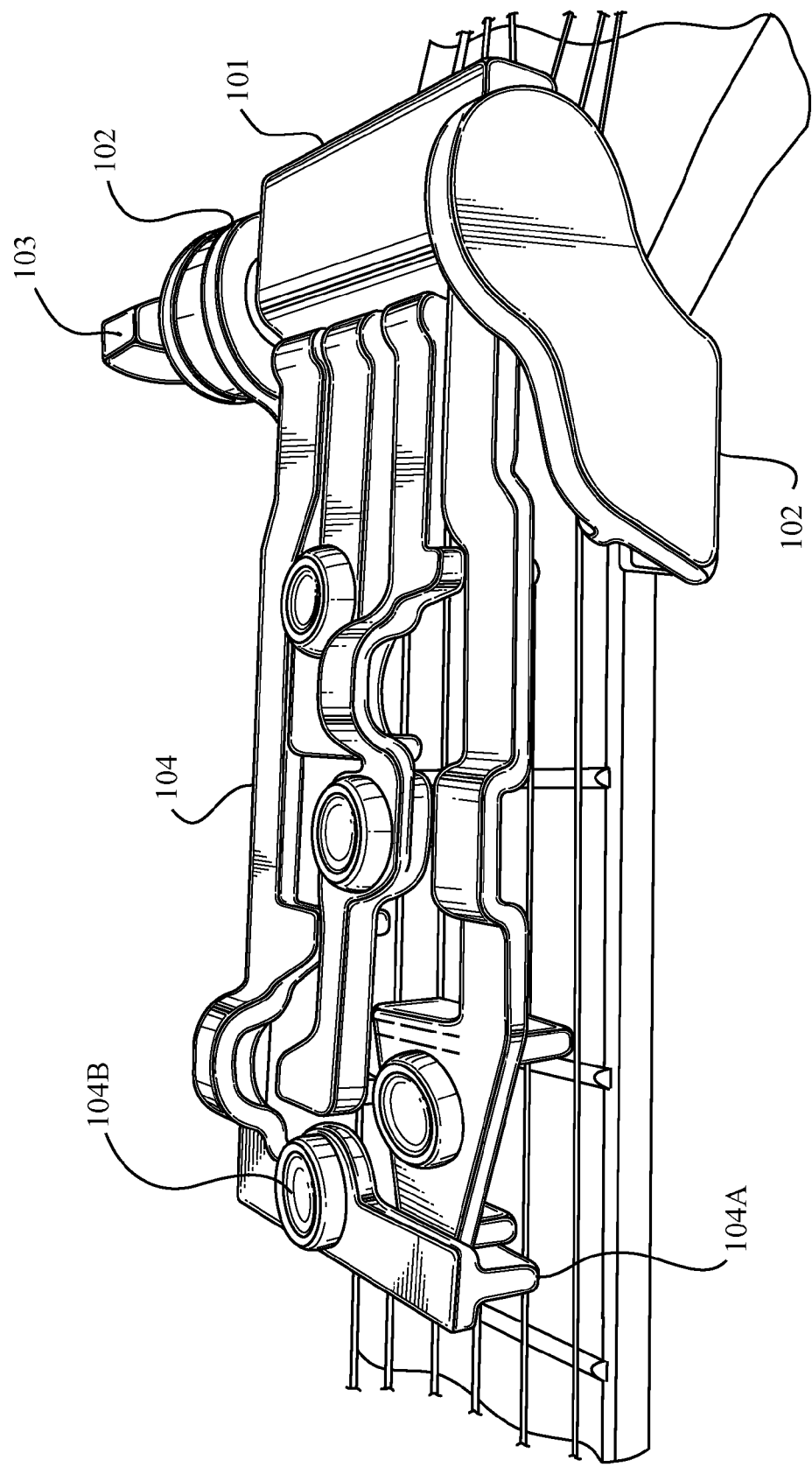
FIG. 1 illustrates a perspective view of an embodiment of the present invention attached to the neck of a guitar.

The first digit of each reference numeral in the above figures indicates the figure in which an element or feature is most prominently shown. The second digit indicates related elements or features, and a final letter (when used) indicates a sub-portion of an element or feature.

DETAILED DESCRIPTION OF THE INVENTION

A standard guitar comprises a neck with two side surfaces, an upper surface, and a lower surface. The neck of the guitar comprises a length dimension, a width dimension, and a depth dimension. The neck further comprises a proximate end, attached to a guitar head, and a distal end, attached to the guitar body. The upper surface of the neck further comprises a series of frets placed perpendicular to the length of the neck and parallel to the width. A series of strings extend above the upper surface of the neck and the frets. The strings are placed in a direction that is perpendicular to the frets. Music is created from the guitar when a string is depressed in a location along the neck, allowing the portion of the string between the depressed location and the guitar body to vibrate, thus creating sound waves. For proper music play, the strings should be depressed between the frets, allowing the closest fret between the depressed location and the distal end of the neck to serve as the end point of the vibrating portion of the string. A standard guitar comprises six strings. The strings vary in thickness. When a guitar is held in standard playing position, the strings are arranged with the thickest string positioned at the top of the neck with each successive string becoming thinner. The thinnest string is referred to as the first string with each string above it referred to by an increasing number. The area of the neck between the first fret and the proximate end of the neck is referred to as the first fret, with each successive area receiving a progressively higher numeric designation.

FIG. 1 illustrates a perspective view of an embodiment of the present invention attached to the neck of a guitar as described above. FIG. 1 discloses a receiving unit 101. The receiving unit 101 is adapted to be positioned above the fretted neck of the guitar. The receiving unit 101 should be placed perpendicular to the strings and parallel to the frets. In the preferred embodiment, the receiving unit 101 is positioned above the proximate end of the guitar neck at the point where the guitar neck attaches to the guitar head. The receiving unit 101 should be configured to receive other components.

FIG. 1 further discloses a plurality of clamp members 102. The clamp members 102 are configured to attach to the receiving unit 101. The clamp members 102 should be configured to adjustably apply pressure to the side of the neck of the guitar. The purpose of the clamp members 102 is to retain the receiving unit 101 in position during use, and the clamp members 102 should be capable of applying sufficient pressure for this purpose. The clamp members 102 prevent the receiving unit 101 from contacting the strings of the guitar during use. If the receiving unit 101 comes in contact with the strings, the receiving unit 101 becomes a capo, which is undesirable for the reasons discussed above. In the preferred embodiment, one clamp member 102 is permanently attached to the receiving unit 101 and one clamp member 102 is removably attached to the receiving unit 101.

FIG. 1 further discloses one or more adjustment members 103. In the preferred embodiment, one adjustment member 103 is used. The adjustment member 103 should be adapted to attach the receiving unit 101 to the clamp members 102. The purpose of the adjustment member 103 is to function as an adjustment means for the clamp members 102. In the preferred embodiment, the adjustment member 103 is a threaded bolt with a handle that threads through one clamp member 102 and into the receiving unit 101. In the preferred embodiment, the adjustment member 103 may be removed so that the present invention is removable from the neck of the guitar. In the preferred embodiment, the adjustment member 103 may also be turned in order to force the clamp member 102 closer to the receiving unit 101 and thereby adjustably apply pressure to the side of the neck of the guitar.

One skilled in the art will recognize that many different combinations of devices may be used to retain the receiving unit 101 in position during use. This disclosure is intended to include and does include those embodiments.

FIG. 1 also discloses a plurality of chord members 104. Each chord member 104 is adapted to be received by, and be removably attached to, the receiving unit 101 in a position substantially parallel to the strings of the guitar. In the preferred embodiment, the receiving unit 101 is capable of receiving four chord members 104 at the same time. Each chord member 104 further comprises one or more string depressors 104A, each capable of depressing a preselected string or strings. The string depressors 104A are positioned at preselected distances from the receiving unit 101, so that when a given chord member 104 is depressed by the user, the associated string depressors 104A depress the appropriate strings at the appropriate locations to form a preselected musical chord. In the preferred embodiment, each cord member further comprises a finger pad 104B which may be used by the user to depress the chord member 104 and the associated string depressors 104A. In the preferred embodiment, the finger pads 104B are smooth to prevent friction from injuring the fingers of new users. In the preferred embodiment, each finger pad 104B is color coded. This allows a companion manual to be employed by a novice user. Said companion manual should describe the proper method of playing common songs by describing the order of the chords to be played by means of a legend which is color coded to correspond to the colors of the finger pads of the chord members. This manual allows the novice user to begin playing music immediately without the need to learn to read standard sheet music.

Figure 2:
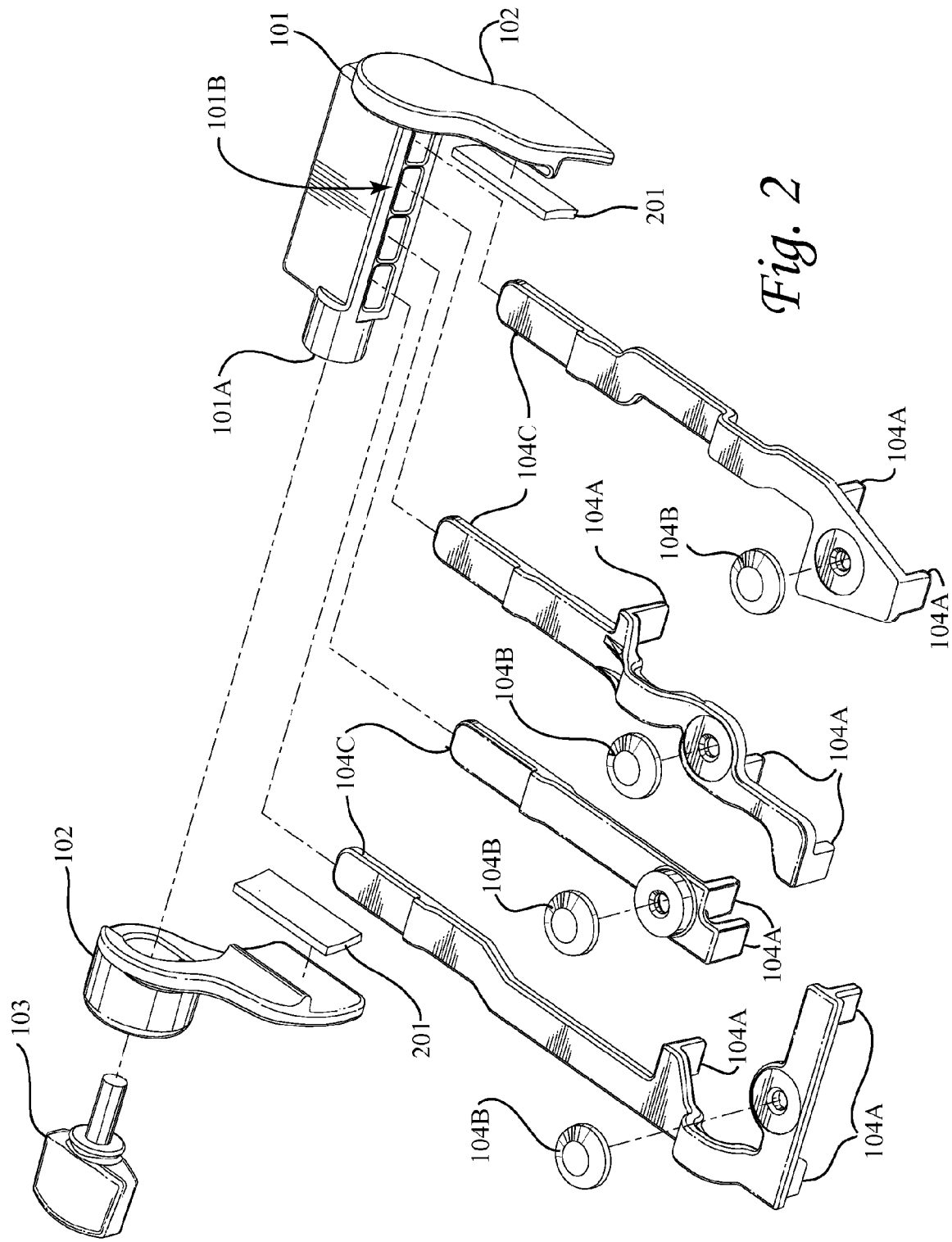
FIG. 2 illustrates an exploded view of an embodiment of the present invention.

FIG. 2 illustrates an exploded view of an embodiment of the present invention. In the preferred embodiment, the receiving unit 101 further comprises an adjustment port 101A. The adjustment port 101A is designed to receive the adjustment member 103 after it is placed through one of the clamp members 102 as discussed above. This allows the adjustment member 103 to attach the receiving unit 101 to the clamp member 102.

The receiving unit 101 further comprises a plurality of chord ports 101B. Each cord port 101B is capable of receiving a chord member. In the preferred embodiment, the receiving member comprises four chord ports 101B, allowing the embodiment to accommodate four chord members 104 at a time. In the preferred embodiment, the chord members 104 each comprise an attachment member 104C. The attachment member 104C of a chord member 104 may be received by a chord port 101B of the receiving unit 101. The attachment member 104C should be removably attached to the chord port 101B. In the preferred embodiment, the attachment member 104C is shaped to allow the chord member 104 to slide a predetermined distance into the chord port 101B of the receiving unit 101. This places each string depressor 104A into the proper position relative to the guitar strings and frets to make the preselected musical chord when the finger pad 104B is depressed.

In the preferred embodiment, the clamp members 102 each further comprise a neck pad 201. The neck pad is positioned between the clamp member 102 and the side surfaces of the neck of the guitar. The neck pad 201 functions as a cushion which prevents the clamp members 102 from damaging the guitar neck when the clamp members 102 are tightened. One skilled in the art will understand that, while the neck pad 201 is not necessary for the proper practice of the present invention, the neck pad 201 prevents unnecessary wear and tear on the guitar neck during use.

While the present invention has been described hereinabove in general terms, the following paragraphs describe the function of specific embodiments of the present invention. One skilled in the art will understand that many variations of the discussed embodiments exist which may be used to play any musical chord on a guitar. These embodiments are contemplated and intended to be included in the present disclosure.

Figure 3:
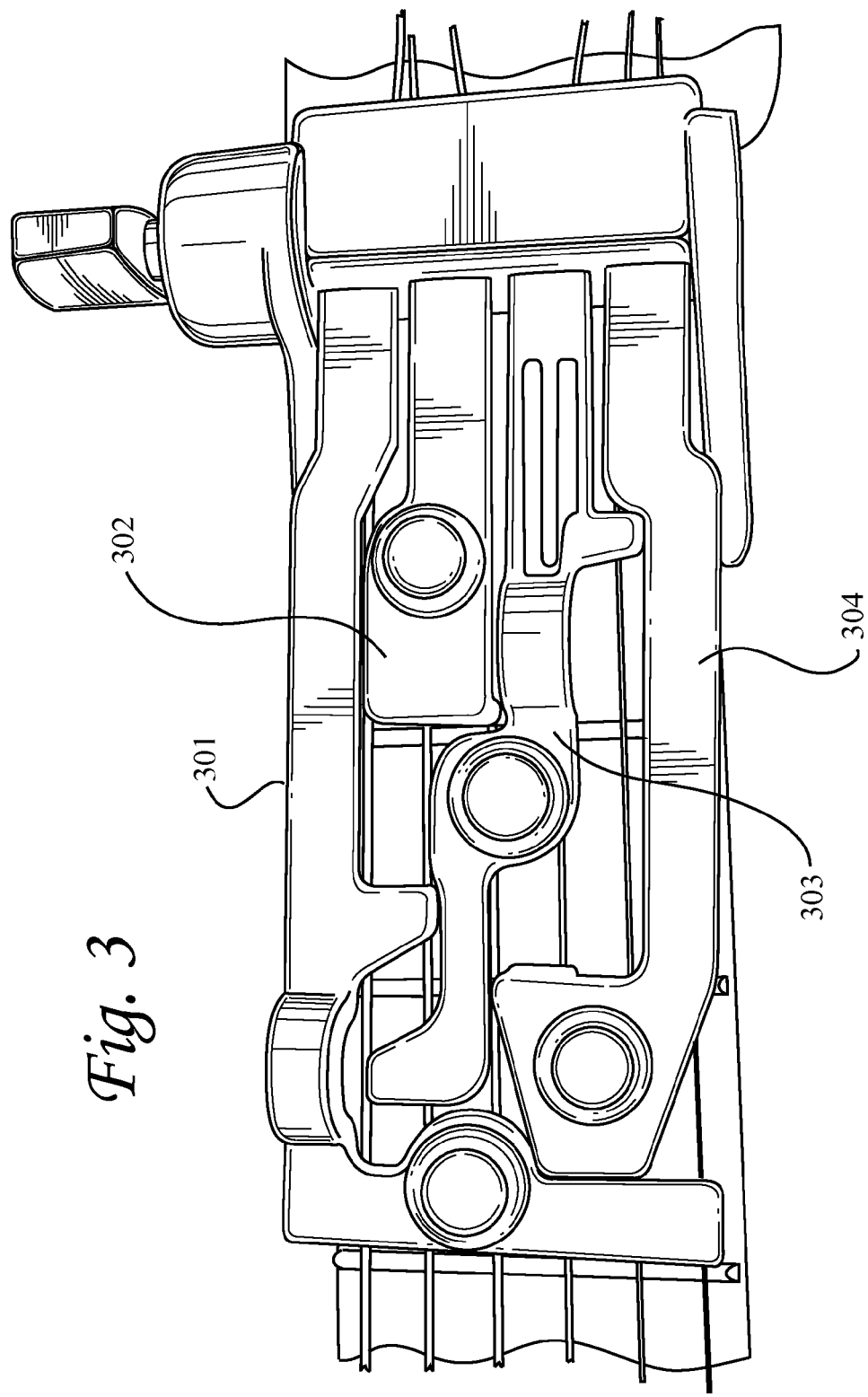
FIG. 3 illustrates a top view of an embodiment of the present invention attached to the neck of a guitar.

FIG. 3 illustrates a top view of an embodiment of the present invention attached to the neck of a guitar. The embodiment illustrated in FIG. 3 can be used to play chords in the key of G. The embodiment illustrated in FIG. 3 discloses four different cord members 104. Chord member GG 301 is designed to form a G chord in the key of G when depressed. Chord member GG 301 comprises three string depressors 104A positioned to depress string one and six at the third fret and string five at the second fret. The finger pad 104B for each chord member 104 is placed in a position that forces all string depressors 104A on that chord member 104 to depress the associated strings when that chord member 104 is depressed.

FIG. 3 also discloses chord member GEM 302. Chord member GEM is designed to form an E minor chord in the key of G. Chord member GEM 302 comprises two string depressors 104A positioned to depress strings five and four at the second fret. FIG. 3 also discloses chord member GC 303, which is designed to form a C chord in the key of G. Chord member GC 303 comprises three string depressors 104A positioned to depress string five at the third fret, string four at the second fret, and the second string at the first fret. FIG. 3 also discloses chord member GD 304, which is designed to form a D chord in the key of G. Chord member GD 304 comprises three string depressors 104A positioned to depress string two at the third fret, and strings one and three at the second fret.

Figure 4:
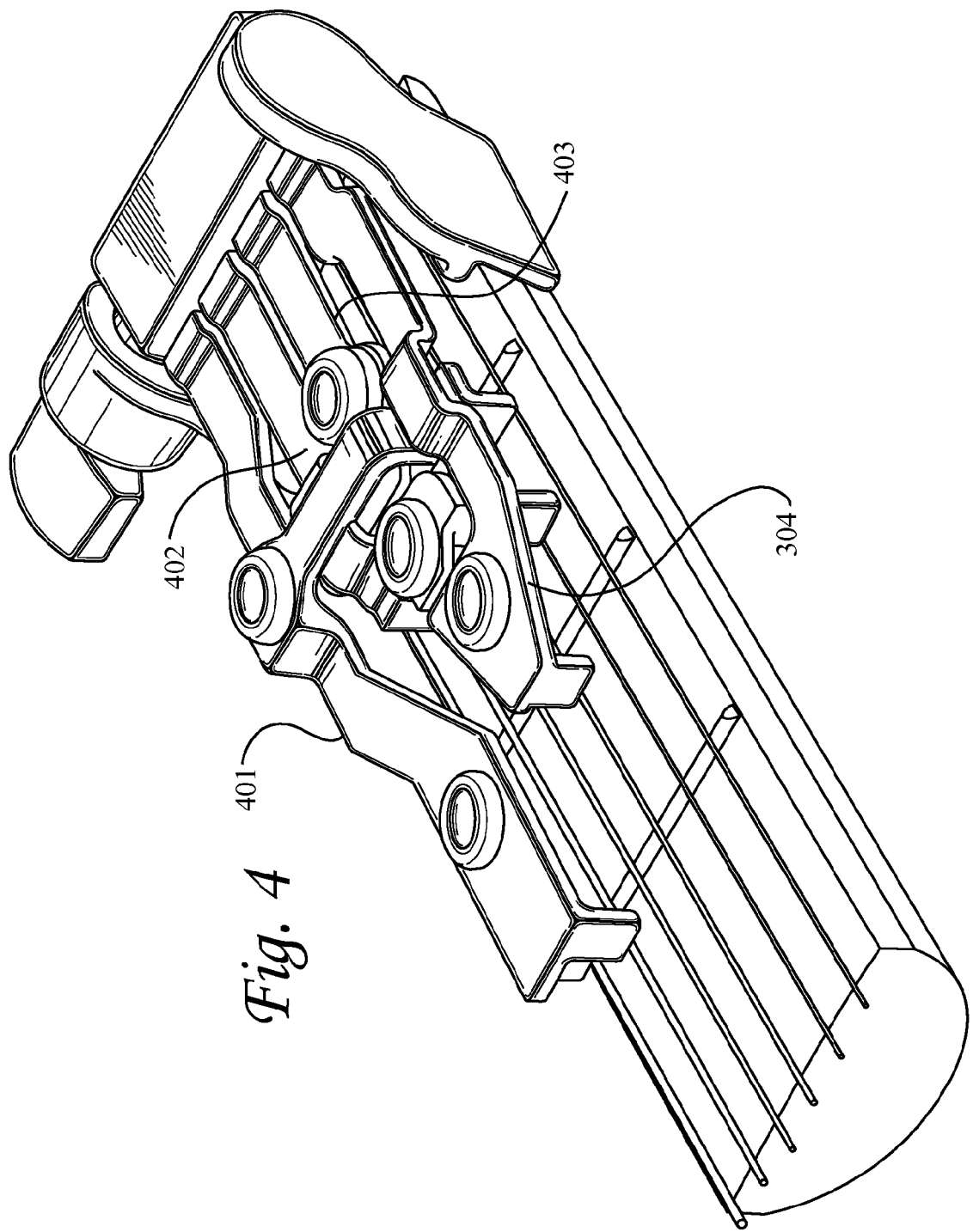
FIG. 4 illustrates a perspective view of a second embodiment of the present invention attached to the neck of a guitar.
Figure 6:
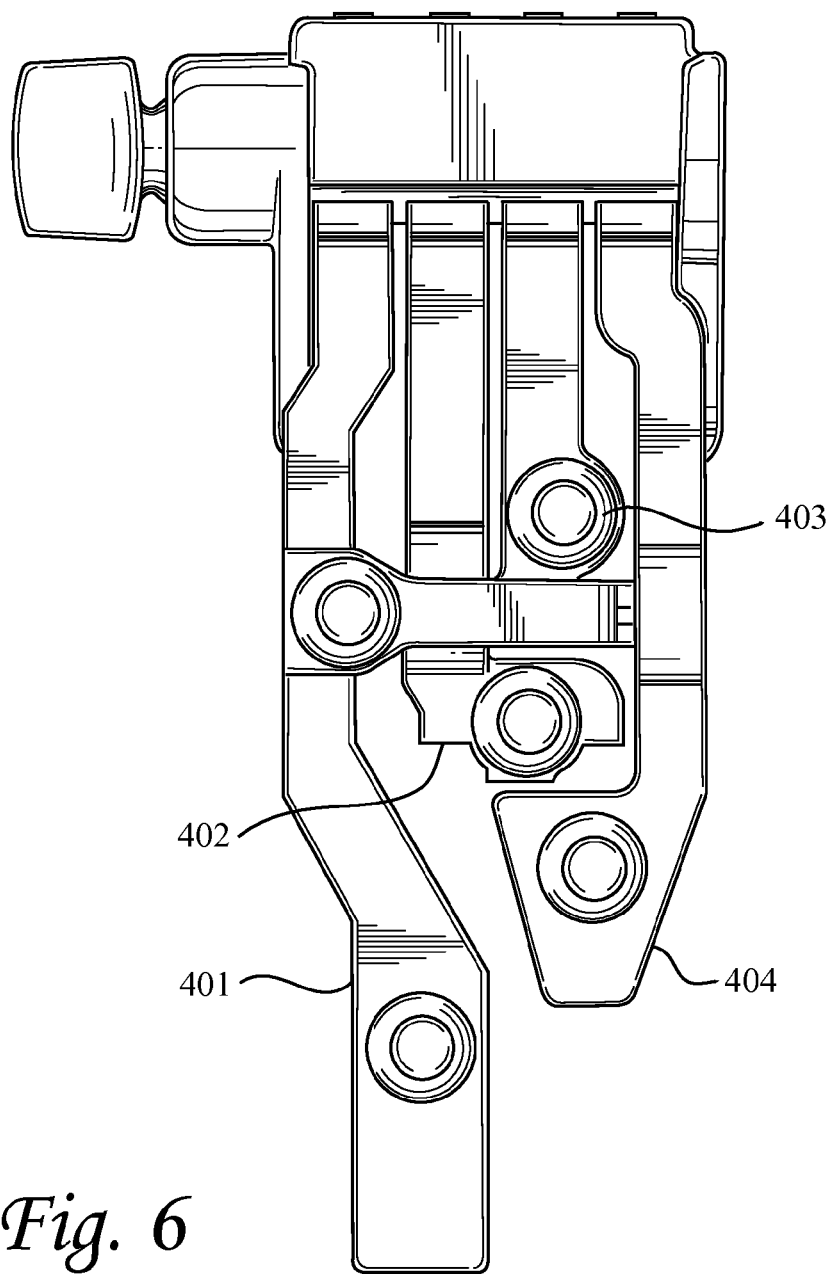
FIG. 6 illustrates a top view of a second embodiment of the present invention.

FIG. 4 illustrates a perspective view of a second embodiment of the present invention attached to the neck of a guitar. The second embodiment comprises the same components as the first embodiment; however, the chord members 104 are selected to play chords in the key of A. The embodiment illustrated in FIG. 4 discloses four chord members 104. FIG. 4 discloses chord member AF 401, which is designed to form an F sharp minor chord in the key of A. Chord member AF 401 comprises three string depressors 104A positioned to depress string four and five at the fourth fret and string one at the second fret. Chord member AF 401 also comprises two finger pads 104B, which assists in causing even depression of the appropriate strings when the finger pads 104B are depressed. FIG. 4 also discloses chord member GD 304, which is designed to form a D chord. FIG. 4 also discloses chord member AA 402, which is designed to form an A chord in the key of A. Chord member AA 402 comprises three string depressors 104A positioned to depress strings two, three, and four at the second fret. FIG. 4 also discloses chord member AE 403, which is designed to form an E chord in the key of A. Chord member AE 403 comprises three string depressors 104A positioned to depress strings four and five at the second fret and string three at the first fret. One skilled in the art will understand that the chord members 104 disclosed in embodiments listed herein may be used in various configurations to play all of the basic chords in the keys of A and G. FIG. 6 illustrates a top view of the second embodiment to ensure that the design of chord member AA 402 and chord member AE 403 can be fully understood by a person of ordinary skill in the art.

Figure 5:
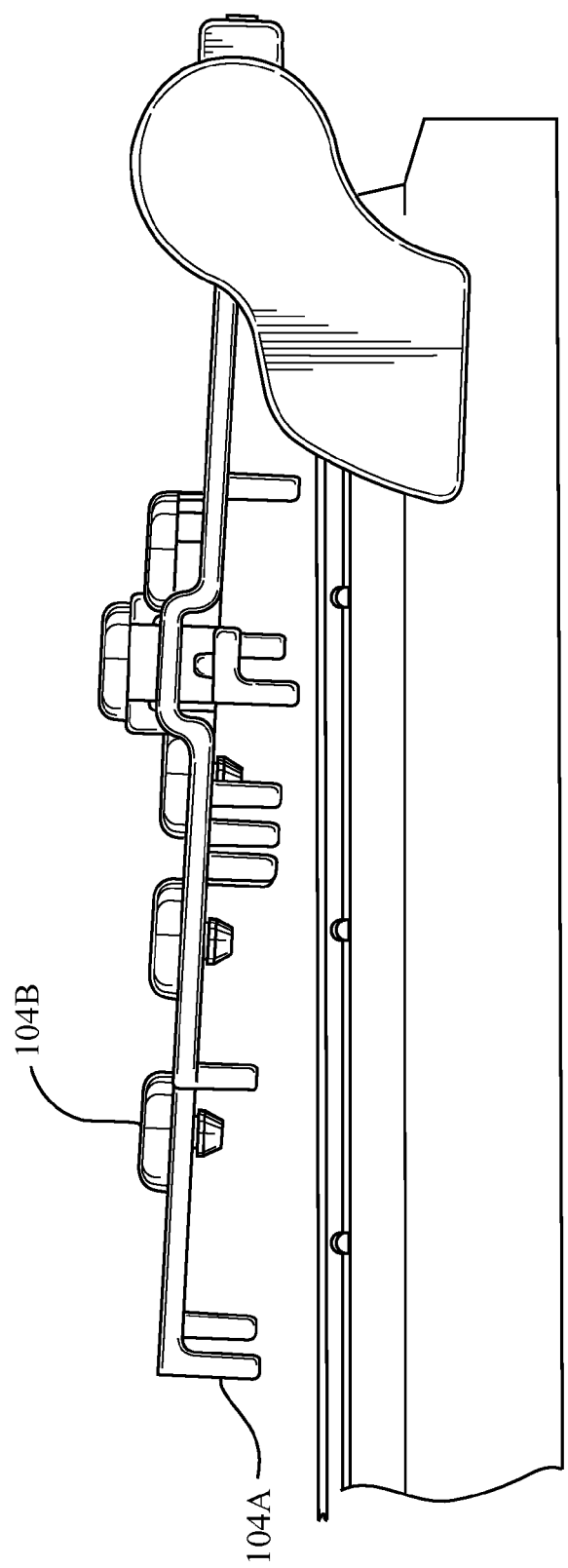
FIG. 5 illustrates a side view of a second embodiment of the present invention attached to the neck of a guitar.

FIG. 5 illustrates a side view of a second embodiment of the present invention attached to the neck of a guitar. In the preferred embodiment, all chord members 104 are essentially planar with the exception of certain irregularities built into particular chord members 104 to allow them to function with other chord members 104. In the preferred embodiment, the plane of the chord members 104 is not parallel with the plane of the upper surface of the guitar neck. In the preferred embodiment, the distance between the finger pad 104B of each chord member 104 and the upper surface of the guitar neck is greater than the distance between the attachment member 104C and the upper surface of the guitar neck. The angle between the plane of the chord members 104 and the plane of the upper surface of the guitar neck compensates for the natural bend that occurs when the chord member 104 is depressed. In this manner, when a chord member 104 is depressed, all of that chord member's string depressors 104A depress their associated strings at essentially the same time.

Figure 7:
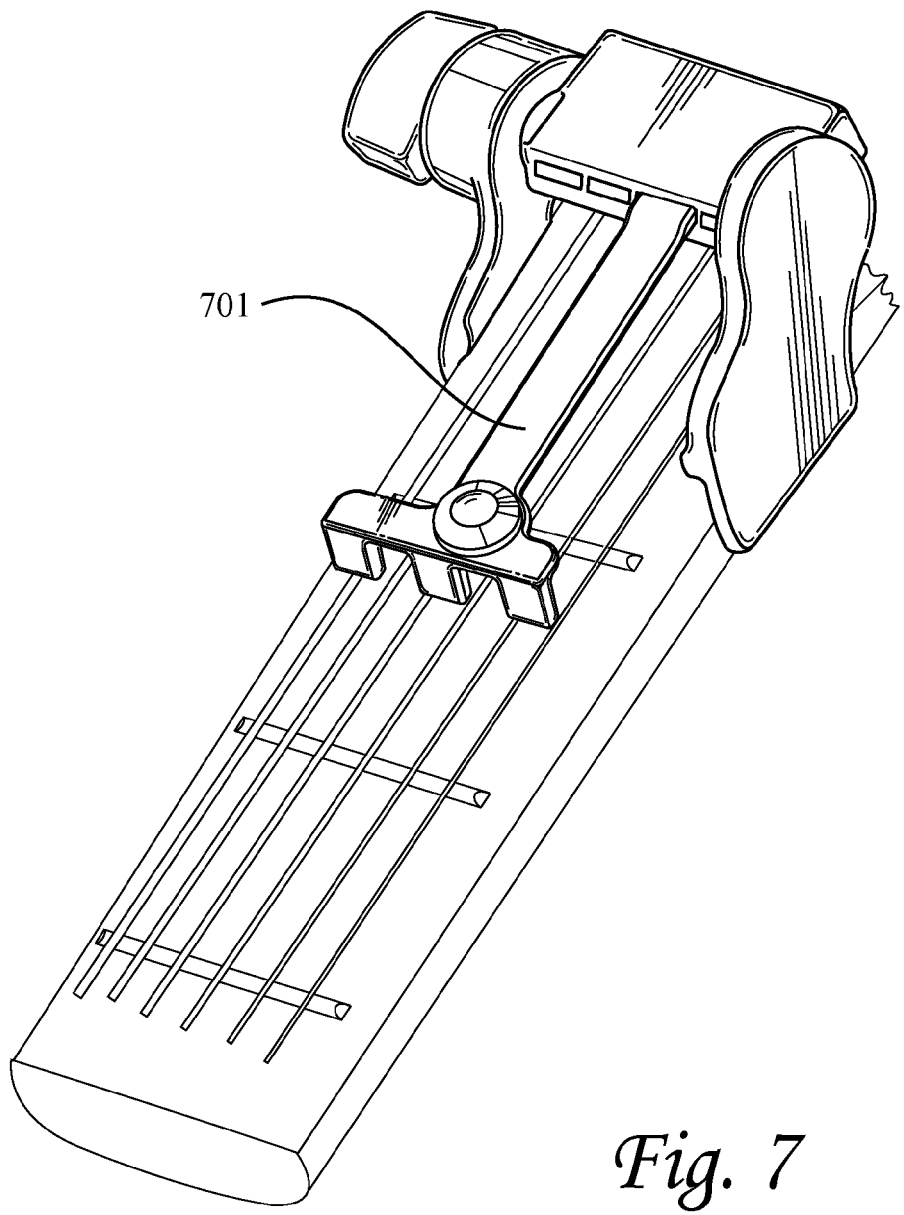
FIG. 7 illustrates a perspective view of a third embodiment of the present invention attached to the neck of a guitar.

FIG. 7 illustrates a perspective view of a third embodiment of the present invention attached to the neck of a guitar. The third embodiment of the present invention comprises a single chord member 104. The specific chord member 104 used in the present embodiment is chord member GBM7 701, which is designed to form a B minor seventh chord in the key of G. Chord member GBM7 701 comprises three string depressors 104A positioned to depress strings one, three, and five at the second fret. In this embodiment, the user has played various chords while using various chord members 104 and has gained an understanding of most of the chord members 104. The user has removed all of the chord members 104 except for GBM7 701. The user plays the other chords in the key of G without mechanical aid, but employs GBM7 701 to play B minor chords until understanding of that particular chord has been gained. It should be recognized that, in an alternate embodiment, GBM7 701 is specifically designed to be used in concert with GD 304, GG 301, and AA 402, to play the chords D, G, A, and B minor. In an alternate embodiment, the user may use any combination of four of the disclosed chord members 104 while learning. As each user will progress at different rates and will have varying difficulty with certain chords, the user may remove or retain different combinations of chord members 104 while using the present invention. This application is intended to disclose, and does disclose, those embodiments.

The method of operation of various embodiments of the present invention is described hereinafter. A user, wishing to use the present invention, acquires a standard guitar. The user may then adjustably attach the receiving unit 101 to the guitar by means of the clamp members 102 and the adjustment members 103. In the preferred embodiment, the neck pad 201 of one clamp member 102 is placed against the guitar neck, a second clamp member 102 is connected to the receiving unit 101, and the adjustment member 103 is threaded through the second clamp member 102 and into the adjustment port 101A of the receiving unit 101.

Once the receiving unit 101 is adjustably attached to the guitar neck, the user may select a plurality of chord members 104 that can be used to play chords in a desired key. By way of a nonlimiting example, the chord members 104 described as the first embodiment and third embodiment above may be used in combination to play chords in the key of G and the chord members 104 described as the second embodiment above may be used in combination to play chords in the key of A. The user may then removably attach the selected chord members 104 to the receiving unit 101. In the preferred embodiment, four chord members 104 may be attached to the receiving unit 101 at the same time.

The user may then begin to play chords on the guitar by depressing the chord members 104 until understanding is gained. The user may reference a color coded companion manual that describes how to play common songs by pressing the color coded finger pads 104B in the proper sequence. Once the user has become familiar with the chords, the user may remove one or more chord members 104 from the receiving unit 101. The user may then play some chords using the chord members 104 and some chords by manually depressing the strings. In this manner, the user may slowly remove the chord members 104 from the guitar until the user is playing without mechanical assistance. This method allows a novice user to feel a sense of accomplishment by quickly learning to play actual music while learning manual string manipulation at a more measured pace. This method creates a rewarding learning experience, reduces the associated learning curve, and reduces the user's resultant frustration, resulting in a more effective learning process.

The chord members 104 can be made of a suitably resilient material, such as plastic. The plastic can be for example, transparent polycarbonate (as used in the commercial embodiment which is shown at www.chordbuddy.com). Other plastics which are suitably resilient, whether or not transparent, could work also. In the commercial embodiment which is shown at www.chordbuddy.com, the finger pad 104B on chord member GG 301 is blue, the finger pad 104B on chord member GEM 302 is yellow, the finger pad 104B on chord member GC 303 is green, and the finger pad 104B on chord member GD 304 is red (though other color combinations could be used)—in this commercial embodiment, the finger pads 104B are all made of opaque plastic, namely polypropylene, though they could, for example, as well be made of other plastic or other material. Dimensions of the commercial embodiment are about 12.6 cm long by about 7.13 cm wide by about 3.35 cm high. The thickness of the chord members 104 is about 2.4 mm-2.6 mm (the longer ones are preferably slightly thicker to make them stronger).

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

I claim:

1. A chord playing attachment adapted to attach to a guitar having a fretted neck, a head, a body, and strings, wherein the neck has a proximate end and a distal end wherein the proximate end is the end closer to the head, and the distal end is the end closer to the body, and wherein the neck has a front surface, two side surfaces, and a back surface, the attachment comprising;
   a receiving unit adapted to be positioned above the fretted neck of the guitar, perpendicular to the strings, and configured to receive other components;
   a plurality of clamp members configured to attach to the receiving unit and adjustably apply sufficient pressure to the side of the neck of the guitar to retain the receiving unit in position during use and prevent the receiving unit from contacting the strings of the guitar during use;
   one or more adjustment members adapted to attach the receiving unit to one or more of the clamp members and function as an adjustment means for the clamp members; and
   a plurality of chord members, each chord member adapted to be received by and removably attached to the receiving unit in a position substantially parallel to the strings, each chord member further comprising one or more string depressors positioned at preselected distances from the receiving unit and capable of depressing preselected strings of the guitar when depressed to make a preselected chord.

2. The chord playing attachment of claim 1, wherein the receiving unit is positioned above the proximate end of the guitar neck at the point where the guitar neck attaches to the guitar head.

3. The chord playing attachment of claim 1, wherein the receiving unit further comprises four chord ports.

4. The chord playing attachment of claim 3, wherein each of the plurality of chord members further comprises an attachment member, the attachement member shaped to allow its chord member to slide a predetermined distance into one of the four chord ports of the receiving unit.

5. The chord playing attachment of claim 1, wherein the receiving unit further comprises an adjustment port.

6. The chord playing attachment of claim 1, wherein each of the plurality of chord members further comprises a finger pad.

7. The chord playing attachment of claim 6, wherein each finger pad is color coded.

8. The chord playing attachment of claim 7, further comprising a companion manual that describes how to play common songs by pressing the color coded finger pads in the proper sequence.

9. The chord playing attachment of claim 1, wherein the chord members are selected to make chords in the key of A.

10. The chord playing attachment of claim 1, wherein the chord members are selected to make chords in the key of G.

11. The chord playing attachment of claim 1, wherein each of the plurality of clamp members further comprises a neck pad positioned between the clamp member and one of the two side surfaces of the neck of the guitar.

12. A method of using the chord playing attachment of claim 1 to learn to play a guitar, comprising:
   adjustably attaching the receiving unit to the guitar by means of the clamp members and the adjustment members;
   selecting a plurality of chord members that can be used to play chords in a desired key;
   removably attaching the chord members to the receiving unit;
   playing chords on the guitar by depressing the chord members until understanding is gained; and
   removing one or more chord members from the receiving unit and playing some chords using the chord members and some chords by manually depressing the strings.

13. The method of claim 12, further comprising playing chords as described in a companion manual.

14. The method of claim 13, wherein each of the plurality of chord members further comprises a color-coded finger pad, and companion manual describes the order of the chords to be played by means of a legend which is color coded to correspond to the colors of the finger pads of the chord members.

* * * * *